United States Patent Office 3,332,872
Patented July 25, 1967

3,332,872
DRILLING FLUID
David T. Oakes, Dickinson, Tex., assignor to Monsanto Company, a corporation of Delaware
No Drawing. Filed Dec. 28, 1962, Ser. No. 247,871
4 Claims. (Cl. 252—8.5)

This invention relates to drilling fluids or muds such as are employed in the rotary drilling of oil and gas wells. More particularly, it relates to the treatment of such drilling muds to control their viscosity.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of water from the borehole to the formation and provides support for the walls to prevent their collapse into the drill hole.

The ability of any given mud to carry out these important functions depends upon certain readily measurable physical properties. Viscosity is an important characteristic. The drilling mud must have a viscosity sufficiently high to permit it to effectively suspend and remove the cuttings from the bottom of the well. On the other hand, the viscosity must at the same time be low enough so that the mud may be readily circulated at the desired rates without requiring excessive pump pressures and/or power consumption.

The properties of the drilling mud are changed during drilling because the strata traversed are composed of shales, clays, etc., which become dispersed in the fluid and produce a gradual increase in the viscosity of the drilling mud with continued use. Contamination by salt brines or as a result of cementing operations likewise cause undesirable increases in viscosity. The custom of using weighting materials, such as barytes or hematite, to increase the density of the mud also results in increased viscosity. If the viscosity is allowed to become too great, difficulties are encountered both in pumping the mud and in removing cuttings from the mud at the surface. Another serious problem with highly viscous fluids is that of "gas cutting." The gas from the formation or formations through which the well passes becomes entrained in the drilling fluid since it cannot readily escape in the surface pits and the fluid which is recirculated consequently has a lower density than is desired. This greatly lessens its effectiveness in holding back formation pressures and significantly increases the possibilities of a blowout. For these reasons, it is obvious that the consistency of the drilling mud must be carefully controlled.

Considerable work has been done in an attempt to develop additives to impart desirable viscosity characteristics to drilling muds. In practice, reduction in viscosity may be achieved by dilution with water or by the addition of various materials commonly called "thinners" or "deflocculants." The former method, while it may be satisfactory in specific instances, has many drawbacks and disadvantages and so the practice of adding various chemicals to drilling fluids to reduce viscosity has become more or less standard. A large number of chemicals such as pyrophosphates, polyphosphates, tannates, humates, phytates, and the like have been employed in the prior art. In many cases, however, the extent to which a drilling fluid can be controlled by such chemicals is limited.

Accordingly, it is an object of the present invention to provide novel, effective, and improved additives which may be employed for the reduction of viscosity in drilling fluids.

A second object of the invention is to provide a method of controlling the viscosity of aqueous drilling muds without adversely affecting other properties such as gel strength and filtration rate.

Another object of the invention is to provide an aqueous drilling fluid having controlled viscosity.

A still further object of the invention is to provide an improved method of drilling oil or gas wells in which the water-base drilling mud herein described is employed.

Other objects and advantages will become apparent to those skilled in the art from the following description and appended claims.

These objects may be accomplished according to the present invention by incorporating in the water-base fluid a sufficient amount of a low-molecular-weight copolymer of styrene and maleic anhydride to maintain the viscosity of the fluid at the desired level. The composition of the present invention may be described briefly as a mixture comprising finely divided solid material, an aqueous vehicle in which the solid material is dispersed or suspended and a sufficient amount of a low-molecular-weight copolymer of styrene and maleic anhydride to maintain the viscosity of the fluid at the desired level. By "low-molecular-weight copolymer" is meant a copolymer of styrene and maleic anhydride whose 1% solution in dimethylformamide has a specific viscosity below a value of 0.7 and preferably has a value in the range from 0.01 to about 0.3 at 25° C. Wherever in this specification and claims specific viscosity is mentioned, it is to be understood that this is determined at 25° C. on a 1% solution (by weight) of the anhydride form of the copolymer in dimethylformamide.

The finely divided solid material of the invention may, of course, be any finely divided solid which is capable of being dispersed or suspended in an aqueous liquid vehicle. Ordinarily, such material will include hydratable clay or colloidal clay bodies such as Wyoming bentonite, commercial medium-yield clays mined in various parts of the country such as in Texas, Tennessee and Louisiana, and those produced when clayey subsurface formations are drilled. Weighting materials added to increase specific gravity such as barytes, iron oxide, and the like may also be included.

The aqueous medium may be fresh water such as is obtained from wells or streams; it may be salt water from the sea or from wells; or it may even include oil-in-water emulsions, i.e., water which has become contaminated in some way with small quantities of oil, or to which such oil has been added to gain some desired advantage.

It is contemplated that the drilling muds of the invention may also contain other additives besides the copolymers of styrene and maleic anhydride of the invention. Materials such as caustic, quebracho, lime, and the like may be added to the drilling mud at the surface while other materials such as gypsum, shale or the like may be encountered in subsurface formations during drilling operations.

The quantities of the styrene-maleic anhydride copolymers to be employed in the drilling mud of the invention will vary with circumstances over a reasonably wide range and the amount employed in a specific suspension or dispersion will depend on these circumstances and the characteristics of the drilling fluid treated. Ordinarily, satisfactory results with regard to viscosity control will be obtained with quantities ranging from one to four pounds per 42-gallon barrel of drilling mud. In some cases where, for example, only small improvements in viscosity are desired, as little as 0.1 lb. of the additive per barrel of mud will produce the desired effect. Above about 4 lb. per barrel, the small viscosity reduction in most cases would not warrant the increased expense of the additional material. The use of larger amounts of the copolymers, for example, in quantities up to 6 lb. per barrel, would not usually have any harmful effects on the mud, but excessive quantities might lead to over-treatment, i.e., produce an increase in viscosity. The exact amount to be added, as previously pointed out, depends upon the original character of the mud and on the properties desired. This can be determined, as is customary in the field, by simple routine tests at the time the addition is made.

The styrene-maleic anhydride copolymers useful in the invention are readily prepared by techniques well known in the art. Generally, the copolymers are prepared by reacting styrene with maleic anhydride in the presence of a free-radical-generating catalyst in an aliphatic or aromatic hydrocarbon which is a solvent for the monomers but is a non-solvent for the copolymer formed. Hydrocarbons suitable for use as the reaction medium include benzene, toluene, xylene, chlorinated benzenes, hexane, acetone, ethylene dichloride and the like. Any free-radical-generating compound soluble in the reaction medium can be employed but organic peroxides such as benzoyl peroxide, acetyl peroxide, butyryl peroxide, ditertiary butyl peroxide, lauroyl peroxide and the like are preferred. The copolymer contains substantially equimolar quantities of the styrene and maleic anhydride residue. The molecular weight of the copolymer may be regulated by proper choice of the catalyst and control of one or more of the reaction variables such as ratio of reactants, temperature and catalyst concentration. Molecular weight is also effectively controlled by including in the polymerization mixture regulators such as mercaptans as described in U.S. Patent 2,606,891. The product is obtained in solid form and is easily recovered by filtration, centrifugation or the like. Removal of any residual or adherent solvent may be effected by evaporation using moderate heating.

Particularly useful as the drilling mud additives of the invention are various derivatives of the styrene-maleic anhydride copolymers such as the acid, the partial acid, the salts, the partial salts, the partial esters, the imides, the partial imides, the amides, the partial amides, and the like. These are prepared by the common techniques well known to those skilled in the art. For example, the copolymers are readily hydrolyzed by heating with water to yield the acid form of the copolymer.

The alkali metal, alkaline earth metal, ammonium or quaternary ammonium slats may be readily obtained by reacting the copolymer in its anhydride or acid form with the stoichiometric amount of the corresponding hydroxide. Alkali metal salts of the copolymers such as sodium, potassium, and lithium salts, alkaline earth metal salts such as barium and calcium salts, the ammonium salt, and the benzyl trimethyl ammonium salt which may be prepared in this manner are all useful in the invention. Partial salts may, of course, be produced by using less than the quantity of alkali required to effect complete conversion of the carboxyl groups. Similarly, other salts of the copolymers, i.e., the di- or partial salts of amines, such as methylamine, triethylamine, diethanolamine, pyridine, piperidine, and morpholine salts, and of heavy metals such as iron, aluminum, copper, and lead salts, are effective drilling mud additives in accordance with the invention.

Useful also as a viscosity-reducing agent is the half-amide, half-ammonium salt form of the styrene-maleic anhydride copolymers. These products are readily prepared by contacting the particles of the finely divided copolymer with ammonia gas at ordinary or elevated temperatures. Moisture may be present if desired. Heat is liberated in the reaction and it is desirable, therefore, to provide some means for dissipating it so that the product will not be affected by excessively high temperatures. One effective means for controlling the heat of reaction consists of suspending the solid polymer in an inert organic liquid such as benzene and bubbling ammonia through the slurry. The half-amide, half-ammonium salt may be converted to the imide derivative by heating.

Esterification of the copolymer is easily effected by reacting it with an alcohol, e.g., methyl, ethyl, propyl, etc. By choice of esterification conditions, partial esters can be obtained running the gamut of extent of esterification; partial esters in which from 0.2 to 0.8 of the total carboxyl groups are esterified are preferred, and the half-esters, i.e., those in which 0.5 of the total carboxyl groups are esterified are quite suitable. Water-soluble diesters can also be used, and can be made by esterifying the copolymer with a water-solubilizing alcohol, e.g., an ether-alcohol made by reacting several moles of ethylene oxide with a lower aliphatic alcohol.

The following examples are presented to particularly illustrate the invention but they are not intended to limit it in any manner except as it is limited in the appended claims.

*Example 1*

A synthetic drilling mud was prepared containing 35% solids dispersed in water. On a dry basis, the solids consisted of 10 parts by weight of Tennessee ball clay, 1 part by weight of Wyoming bentonite and 4 parts by weight of Dixie bond clay. The "break-over" from sodium-base to lime-base fluid was achieved by adding 5 g. of hydrated lime and 1 g. of caustic for each 350 ml. of the suspension. Varying amounts of a hydrolyzed copolymer of styrene and maleic anhydride having a specific viscosity of 0.039 were added to 350-ml. samples of mud. Before use the copolymer had been reacted with a substantially stoichiometric quantity of sodium hydroxide and enough water to effect solution and convert it to the sodium salt form. The samples were then tested by means of the standard procedures given in "Recommended Practice for Standard Field Procedure for Testing Drilling Fluids" of the American Petroleum Institute, Third Edition, May 1950, except as otherwise indicated. The flow behavior of the mud was determined with a multi-speed Fann V-G viscosimeter. A description of this instrument, the plastic flow properties it measures, and their significance in drilling mud control may be found in Melrose and Lilienthal, J. Pet. Tech., TP. 3061, p. 159 (1951). In general, field control of mud viscosity properties is directed toward the maintenance of a constant and preferably low resistance to flow. One measurement of this resistance to flow with the Fann viscosimeter is the yield point which is actually a measurement of the interparticle forces in the mud. Chemical treatment of the mud directly affects the yield point; hence, the effectiveness of a particular chemical additive as a thinner or in reducing resistance to flow is directly measurable by means of the yield point. Results of the tests are presented in Table I.

cific viscosity of 0.015. This copolymer as in Examples 1 and 2 had been reacted with the stoichiometric quantity of

TABLE I

| Amt. of Additive (lb./bbl.) | pH | Viscosity | | | Gel Strength | | Filtration Rate, cc. in 30 min. API |
|---|---|---|---|---|---|---|---|
| | | Fann (600 r.p.m.) (cp.) | Plastic (cp.) | Yield Point (lb./100 ft.[2]) | 0 Min. (g.) | 10 Min. (g.) | |
| 0.0 | 12.0 | [1] Plastic | [1] Plastic | [1] Plastic | [1] Plastic | [1] Plastic | [2] 50 |
| 0.5 | 12.0 | 27.5 | 12 | 31 | 27.0 | 29.0 | 73.5 |
| 1 | 12.1 | 8.0 | 6 | 4 | 8.0 | 15.0 | 65.5 |
| 2 | 12.1 | 7.0 | 6 | 2 | 4.0 | 19.0 | 56.5 |
| 3 | 12.0 | 7.5 | 7.5 | 0 | 1.0 | 16.0 | 49.0 |

[1] Above 150 centipoises or not measurable.
[2] 1.5 min.

These data demonstrate that the addition of the low-molecular-weight copolymers of styrene and maleic anhydride of the invention in quantities of one-half to one pound per barrel and upward effects a drastic reduction in viscosity of the mud without adversely affecting its thixotropic properties or its filtration rate characteristics.

*Example 2*

The tests described in Example 1 were repeated on a sodium-base mud. The stock sodium-base mud employed was essentially the mud used in Example 1 except that no lime was added. Results recorded in Table II demonstrate that the copolymer of the invention is effective in the sodium-base mud as well as it is in the lime-based mud.

sodium hydroxide and enough water to effect solution and and convert it to the sodium salt form. The addition of the copolymer caused some foaming of the mud. This foaming was reduced, however, by the addition of a few drops of n-octyl alcohol. The data obtained are presented below in Table III and it will be seen that comparable quantities of this particular styrene-maleic anhydride copolymer produced effects on viscosity in the same order of magnitude as did the copolymer additive of Example 2 on the same stock mud samples.

TABLE III

| Amt. of Additive (lb./bbl.) | Viscosity | | | Gel Strength | |
|---|---|---|---|---|---|
| | Fann (600 r.p.m.) (cp.) | Plastic (cp.) | Yield Point (lb./100 ft.[2]) | 0 Min. (g.) | 10 Min. (g.) |
| 0 | 75 | 14 | 122 | 40 | 56 |
| 0.5 | 10 | 7 | 6 | 6 | 16 |
| 1.0 | 13 | 11 | 4 | 1 | 8 |

*Example 4*

The viscosity-reducing characteristics of the styrene-maleic anhydride copolymer employed in Example 1 were also determined with a sea-water mud. The sea-water mud

TABLE II

| Amt. of Additive (lb./bbl.) | pH | Viscosity | | | Gel Strength | | Filtration Rate, cc. in 30 min. API |
|---|---|---|---|---|---|---|---|
| | | Fann (600 r.p.m.) (cp.) | Plastic (cp.) | Yield Point (lb./100 ft.[2]) | 0 Min. (g.) | 10 Min. (g.) | |
| 0 | 4.6 | 75 | 14 | 122 | 40 | 56 | 25.3 |
| 0.25 | 4.8 | 15 | 8 | 14 | 11 | 16 | 23.1 |
| 0.5 | 5.1 | 9 | 8 | 2 | 1 | 6 | 21.5 |
| 1.0 | 5.6 | 11 | 11 | 0 | 0 | 1 | 13.6 |

*Example 3*

The tests described in Example 2 were repeated using a copolymer of styrene and maleic anhydride having a spewas made up in exactly the same manner as the sodium-base mud of Example 2 except that the sea water from the Gulf of Mexico was employed instead of fresh water. Results are presented in Table IV.

TABLE IV

| Amt. of Additive (lb./bbl.) | pH | Viscosity | | | Gel Strength | | Filtration Rate, cc. in 30 min. API |
|---|---|---|---|---|---|---|---|
| | | Fann (600 r.p.m.) (cp.) | Plastic (cp.) | Yield Point (lb./100 ft.[2]) | 0 Min. (g.) | 10 Min. (g.) | |
| 0 | | [1] Plastic | [1] Plastic | [1] Plastic | [1] Plastic | [1] Plastic | 41.6 |
| 0.5 | 11.9 | 11.5 | 9 | 5 | 6 | 14 | 30.2 |
| 1.0 | 11.8 | 11.0 | 11 | 0 | 3 | 15 | 27.2 |
| 2.0 | | 19.5 | 17 | 5 | 1 | 9 | 24.5 |

[1] Above 150 centipoises or not measurable.

*Example 5*

Since it is important that the drilling mud be stable at the bottom hole temperatures encountered in drilling which sometimes reach as high at 250° F., the mud compositions of Examples 1, 2 and 4 were subjected to a temperature of 250° F. for 72 hours and then retested by the same procedures used originally. The data obtained are presented in Table V.

TABLE V

| Type Mud | Amt. of Additive (lb./bbl.) | pH | Viscosity | | | Gel Strength | | Filtration Rate cc. in 30, min. API |
|---|---|---|---|---|---|---|---|---|
| | | | Fann (600 r.p.m.) (cp.) | Plastic (cp.) | Yield Point (lb./100 ft.[2]) | 0 Min. (g.) | 10 Min. (g.) | |
| Lime-base | 0 | | [1] Plastic | [1] Plastic | [1] Plastic | [1] Plastic | [1] Plastic | [2] 50 |
| Do | 0.5 | 10.8 | 32 | 26 | 12 | 36 | 86 | 38.0 |
| Do | 1 | 10.9 | 8 | 8 | 0 | 1 | 12 | 29.2 |
| Do | 2 | 11.2 | 10 | 10 | 0 | 1 | 3 | 22.0 |
| Do | 3 | 11.2 | 17.5 | 17 | 1 | 3 | 9 | 15.2 |
| Sodium-base | 0 | 4.7 | 23.5 | 9 | 29 | 19 | 18 | 26.1 |
| Do | 0.25 | 4.8 | 11 | 8 | 6 | 4.5 | 11 | 22.8 |
| Do | 0.5 | 5.2 | 9.5 | 9 | 1 | 0.5 | 7 | 22.8 |
| Do | 1.0 | 5.2 | 13.5 | 13 | 1 | 0.5 | 9 | 16 |
| Sea Water | 0 | | [1] Plastic | [1] Plastic | [1] Plastic | [1] Plastic | [1] Plastic | 44.5 |
| Do | 0.5 | 12 | 44.5 | 7 | 75 | 35 | 42 | 34 |
| Do | 1.0 | 12 | 30.5 | 11 | 39 | 24 | 33 | 27.8 |
| Do | 2.0 | 11.9 | 30 | 15 | 30 | 21 | 44 | 16.7 |

[1] Above 150 centipoises or not measurable.
[2] 1.5 min.

When compared with the data given in Tables I, II and IV, the data in Table V convincingly demonstrate that the copolymer additives of the invention suffer little loss in their effectiveness as thinners when the mud in which they are incorporated is subjected to elevated temperatures. In fact, in some instances, the treating agents appear to be slightly more effective at the high temperatures. The ability to maintain reduced viscosity under such severe temperature conditions is not a usual property found in most of the thinners of the prior art. The styrene-maleic anhydride copolymers of the present invention are, therefore, highly advantageous in this use.

Consideration of the foregoing data will make it apparent that there are provided by this invention some particularly valuable additives for the control of viscosity in drilling muds. The copolymers of the invention act as thinners in drilling fluids containing clays of divergent characteristics. Their beneficial effects on the mud viscosity is obtained at little or no sacrifice in other important properties such as gel strength or filtration rate. In fact, in many instances, the styrene-maleic anhydride copolymers tend to enhance these other properties as well although they have not as dramatic and conclusive an effect upon them as they do upon viscosity. In addition, these copolymer additives are not subject to decomposition and the muds in which they are incorporated have excellent heat stability, i.e, the efficacious effect of the mud additives is not significantly different even when the mud is subjected to elevated temperatures.

What is claimed is:

1. A drilling fluid comprising an aqueous suspension of finely divided solid inorganic materials and a sufficient amount of a copolymer of styrene and maleic anhydride having a specific viscosity in the range from about 0.01 to about 0.3 to maintain the viscosity of the mud low enough so that it can be circulated.

2. The composition of claim 1 wherein the styrene-maleic anhydride copolymer is present in the form of its alkali metal salt.

3. A drilling fluid comprising an aqueous suspension of finely divided solid inorganic materials and a sufficient amount of a copolymer of styrene and maleic anhydride in the form of its sodium salt having a specific viscosity of about 0.039 to maintain the viscosity of the mud low enough so that it can be circulated.

4. A drilling fluid comprising an aqueous suspension of finely divided solid inorganic materials and a sufficient amount of a copolymer of styrene and maleic anhydride in the form of its sodium salt having a specific viscosity of about 0.015 to maintain the viscosity of the mud low enough so that it can be circulated.

References Cited

UNITED STATES PATENTS

| | | | |
|---|---|---|---|
| 2,718,497 | 9/1956 | Oldham et al. | 252—8.5 |
| 2,857,365 | 10/1958 | Johnson | 252—8.5 |
| 2,911,366 | 11/1959 | Hedrick et al. | 252—8.5 |
| 2,979,454 | 4/1961 | Fields et al. | 252—8.5 |

LEON D. ROSDOL, *Primary Examiner.*

ALBERT T. MEYERS, JULIUS GREENWALD,
*Examiners.*

H. B. GUYNN, *Assistant Examiner.*